(No Model.) 3 Sheets—Sheet 1.
D. S. DEADERICK.
COTTON PICKER.
No. 590,090. Patented Sept. 14, 1897.
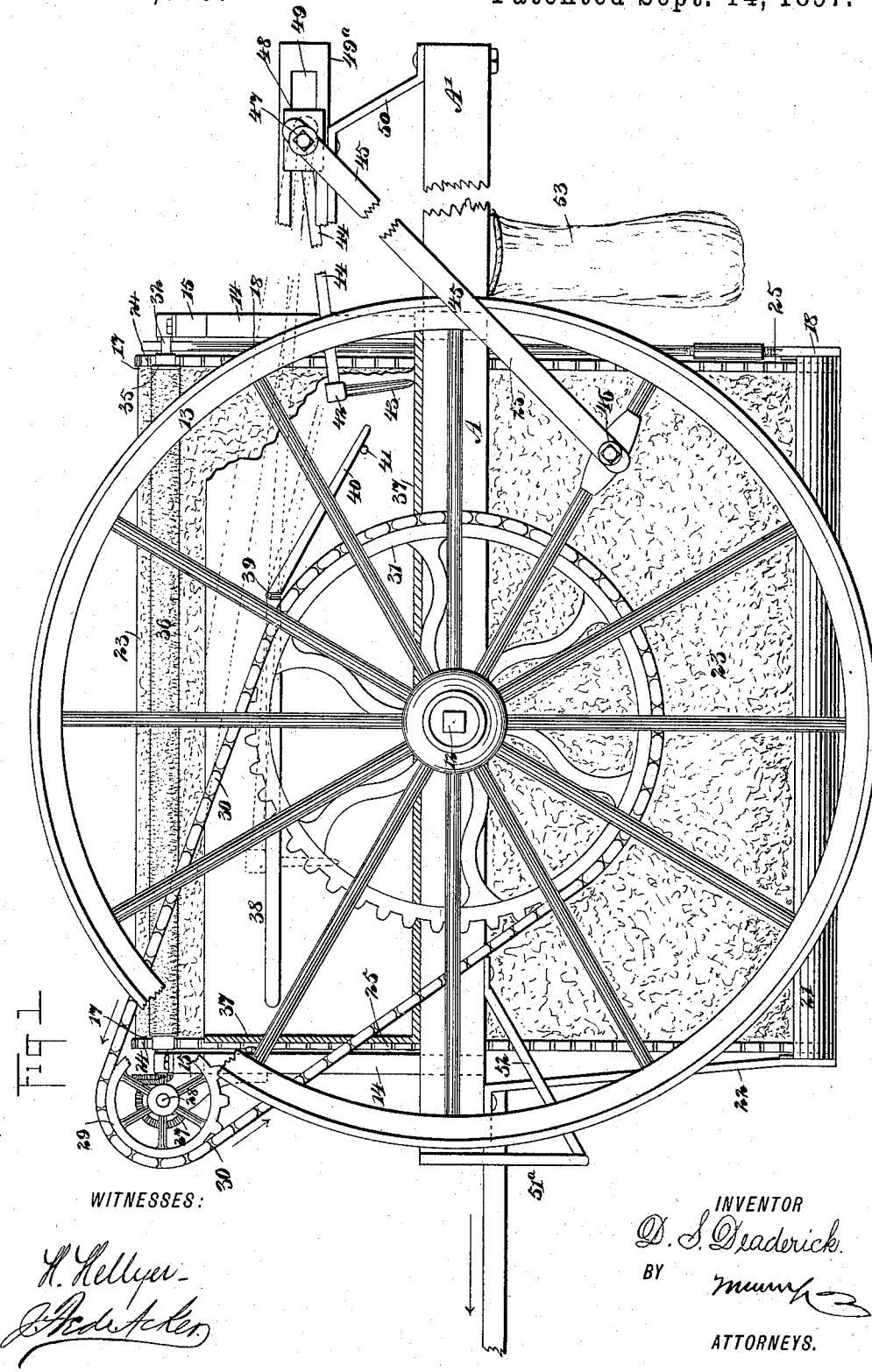
WITNESSES:
INVENTOR
D. S. Deaderick.
BY
ATTORNEYS.

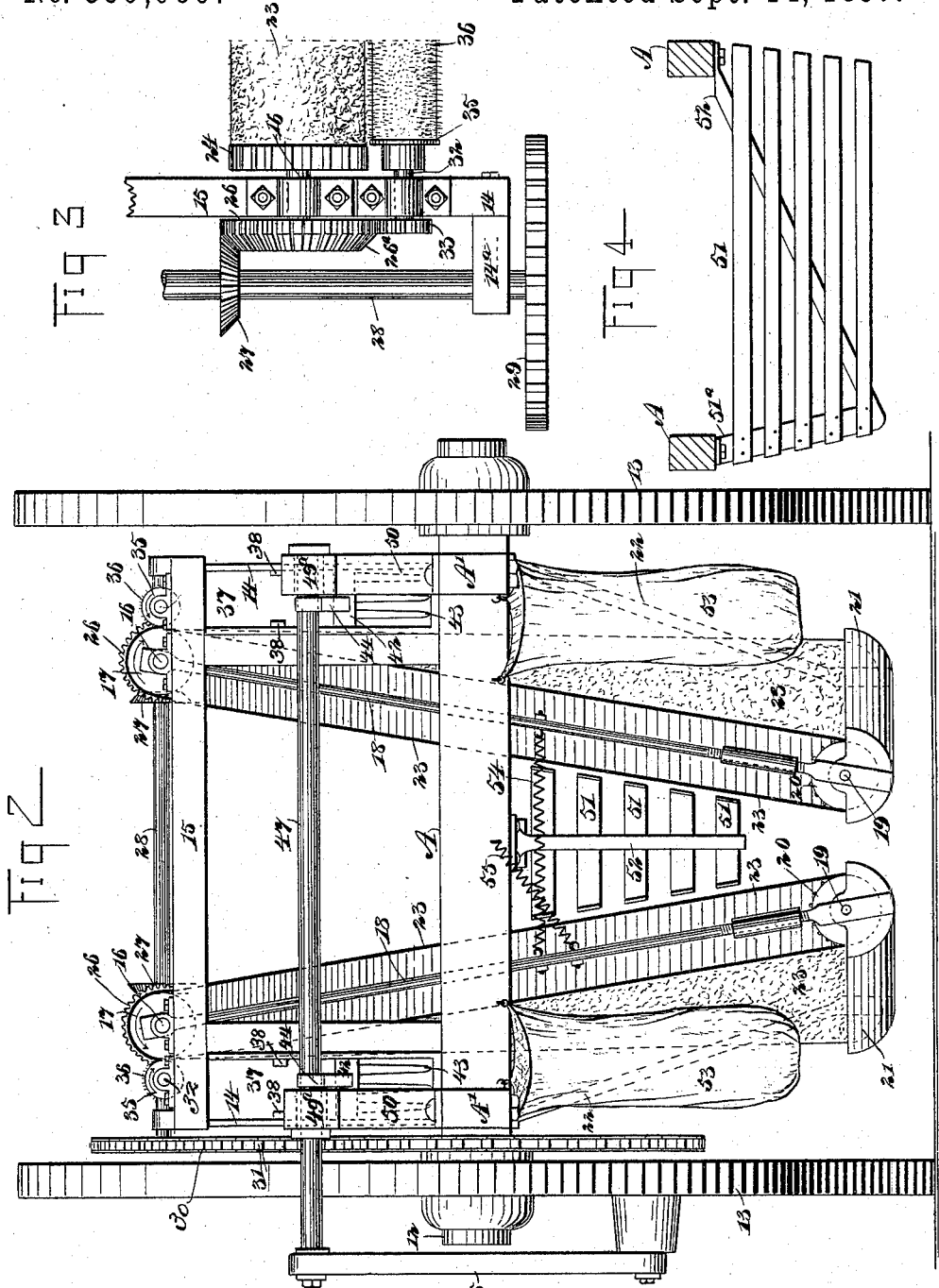

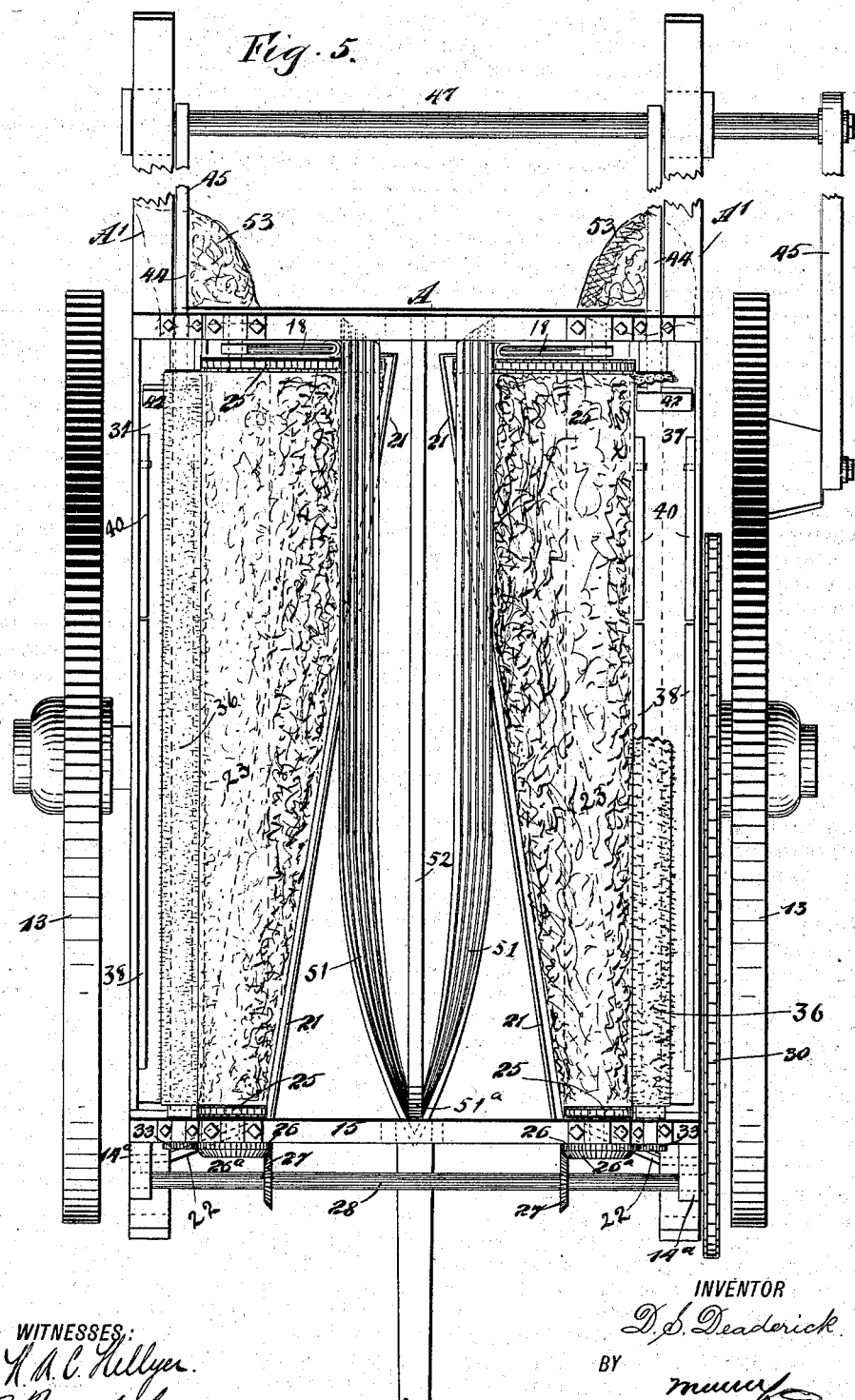

UNITED STATES PATENT OFFICE.

DAVID S. DEADERICK, OF MAMMOTH SPRING, ARKANSAS.

COTTON-PICKER.

SPECIFICATION forming part of Letters Patent No. 590,090, dated September 14, 1897.

Application filed June 18, 1896. Serial No. 596,005. (No model.)

*To all whom it may concern:*

Be it known that I, DAVID S. DEADERICK, of Mammoth Spring, in the county of Fulton and State of Arkansas, have invented a new and Improved Cotton-Picker, of which the following is a full, clear, and exact description.

This invention relates to certain improvements in cotton-pickers; and it has for its object to provide a machine of a simple and inexpensive construction, which shall be adapted for picking cotton from a field in a thorough and cleanly manner, thereby effecting a very important economy in the labor required in harvesting a crop.

Another object of the invention is to provide a wheeled frame adapted to be moved over a field and provided with picking devices preferably of the nature of endless bands arranged to engage the bolls of the cotton-plants and remove the fiber therefrom, means for delivering the plants to the picking devices, and means for cleaning the cotton from said picking devices and delivering the said cotton to distributing devices, to be hereinafter particularly described.

The invention also contemplates certain novel features of construction and combinations and arrangement of parts, whereby certain advantages are obtained and the device is made better adapted for use than other cotton-pickers devised, the picking devices being made somewhat yielding in order to permit them to accommodate themselves to various positions of the plants, so as to work thoroughly and smoothly under various conditions.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the cotton picker or harvester constructed according to my invention, the side walls of the cotton receptacle or hopper and a portion of a ground-wheel being broken away to better illustrate certain features of construction. Fig. 2 is a rear elevation of the machine, showing the preferred arrangement of the picking devices. Fig. 3 is an enlarged fragmentary detail view showing the means for driving the endless picker-cloths and the means for removing the cotton therefrom. Fig. 4 is a detail view, drawn to a small scale, and showing the form of the spreader adapted to be located between opposing cotton-gathering devices; and Fig. 5 is a plan view of the machine, parts being broken away.

In carrying out the invention, A represents the frame of the machine, which may be of any form, dimensions, and material deemed best suited for the purpose, and is provided with a tongue or other means of hitching draft-animals thereto, together with rear extensions A' of the side bars of the frame. Spindles 12 are secured to each side of the frame, upon which ground-wheels 13 are mounted. At the forward or at the rear ends of the frame A the said frame is provided with vertical standards 14, one at each side of each end of the frame, the said standards at each end of the frame being connected or tied together at their upper ends by means of brace beams or bars 15, extending between them.

Shafts 16 are arranged to extend longitudinally of the frame along the sides thereof, and at their opposite ends these shafts are journaled in the end portions of the respective brace-beams 15, and between the brace-beams 15 drums or rollers 17 are fixed on the said shafts. At the rear ends of the shafts 16 the upper ends of hangers 18 are loosely mounted, and the said hangers extend down below the frame A and have journaled in their lower ends the rear extremities of shafts 19, whereon are fixed drums or rollers 20 similar to the drums or rollers 17 on the shafts 16. The forward ends of the said shafts 19 are journaled in hangers 22 of less length than the hangers 18, the hangers 22 being secured at their upper ends to the forward portion of the frame A. Both sets of hangers 18 and 22 are preferably given a downward and inward inclination, whereby their lower ends are made to converge to a greater or less extent; but the distance is greater between the hangers of the forward set than between the hangers of the rear set.

The lower ends of the hangers 18 and 22 are made to extend down below the under sides of the respective rollers or drums 20, and the lower ends of the hangers 18 and 22 carry shoes 21, formed of sheet metal or other suitable material bent, as clearly shown in Fig. 2, to a curved form in cross-section corresponding to the curved peripheries of the said drums or rollers, from which they are spaced slightly apart, and these shoes 21 form projecting housings for the lower portions of picking cloths or aprons 23, which are carried on the respective upper and lower rollers 17 and 20 and serve to prevent the said cloths from coming in contact with the earth, stones, &c., whereby the picking devices might be rendered unfit for use.

At their opposite ends the rollers 17 and 20 are provided with correspondingly-formed sprocket-wheels 24, over which chain-belts 25, secured to the said cloths or aprons, are passed, whereby the aprons or cloths are driven uniformly and positively. The said chain-belts serve also to gear the upper and lower rollers together, so that the lower rollers 20 will be driven from the upper rollers 17. In order to drive the said upper rollers, each shaft 16 is provided at one of its ends, usually its forward end, with a gear-wheel 26, having a beveled upper face 26$^a$, as shown particularly in Fig. 3, the beveled portion 26$^a$ meshing with a similar and preferably smaller gear-wheel 27, secured on a cross-shaft 28, journaled at its ends in brackets 14$^a$, the said brackets being secured to the forward standards 14. The said shaft 28 is provided at one end with a large chain-wheel 31, located on the hub or spokes of one of the ground-wheels 13.

The picker-cloths 23 will be formed by preference of coarse carding-cloth—such, for example, as is known as "licker-in" cloth—the projections upon the upper stretch pointing upward, and in the movement of the said cloths the cards thereon engage with and remove the cotton from the bolls and retain the same, and in order to remove the cotton thus retained by the said picker-cloths 23 I provide rotating combs or brushes, one for each cloth, which I will now describe.

Opposite the shafts 16 smaller shafts 32 are journaled at their ends in the respective brace-beams 15, and the said shafts are provided with pinions 33, meshing with the gears 26 on the upper rollers, carrying the picker-cloths, as shown in Fig. 3. The shafts 32 extend parallel to the shafts 16, and on the said shaft 32 rollers or drums 35 are secured, each having a face-sheet 36 of card-cloth or the like or a brush-face of any description arranged to engage the cards or picking-surfaces of the picker-cloths 23 as the said latter cloths pass over the rollers 17 and 20, as clearly shown in the drawings. These rollers 36 may be termed "cleaning-rollers," as they remove the cotton from the picker cloths or aprons.

Below each of the rollers 35 a narrow hopper or receptacle 37 is located, as shown in Figs. 1 and 2, and at opposite sides of each of the said hoppers 37 fixed guide-strips 38 are attached in parallel order, and to the rear ends of these fixed guide-strips other hanging guides 40 are connected by hinges 39, as shown in Fig. 1, and these added guides have normally a downward and a rearward inclination, the said guides being supported at their rear ends in their inclined position by engagement with stops or pins 41, secured in the walls of the hopper 37. The guides on the respective hoppers are each arranged to engage a rake 42, having teeth 43 directed downwardly from its lower side, each rake being provided with a handle 44, which extends rearwardly, and the said rake-handles are operated through the medium of a connecting-rod 45, the forward end of which is coupled, as shown at 46, to one of the ground-wheels 13 of the machine. The rear end of the connecting-rod is attached to a cross-bar 47, which is provided with blocks 48, and these blocks are held to slide in slots 49, made in the horizontal brace-bars 49$^a$, supported over the rear extension A' of the frame by means of brackets 50, as shown in both Figs. 1 and 2, the handles of both of the rakes being secured to this cross-bar, so that the rakes move in unison, and as the ground-wheels of the machine rotate the rakes will be given a reciprocating movement in the hoppers. It will be understood that the cross-bar 47 may have a connection with both ground-wheels, if desired, or that either or both of the ground-wheels may be employed for driving the rakes, the connection being made in any well-known manner.

A spreader is employed in connection with the machine, and the said spreader is illustrated in side elevation in Fig. 4 and in plan view in Fig. 5. It is composed of a series of slats or strips 51 of steel or other spring material, placed one above the other, and the entire spreader is preferably somewhat V-shaped in plan view, and the slats also usually graduate in length from top to bottom, the uppermost slat being the longest and the lowermost slat the shortest. The said slats at their forward ends are secured to a downwardly and rearwardly extending bar 51$^a$, secured to the front of the frame and braced by a bar 52, which is connected with the other end of the front carrying-bar 51$^a$ and extends upwardly and rearwardly to an attachment to the rear portion of the frame at the center. This spreader is located between the two picker-cloths, and the sides of the spreader extend parallel with the picker-cloths near which they are located, and the shape of the spreader is such that it will have practically the form of the prow of a boat, so that it will enter like a plow into the midst of a single row and force the branches apart part one way and part another, pressing the plants elastically against the inner operative faces of the picker-cloths 23, whereby the cotton may be removed therefrom in a thorough manner.

As the rakes move forward they engage the inclined ends 40 of the guides and are raised upward and will travel over the fixed guides 38, as shown in dotted lines in Fig. 1, and at the end of their forward stroke the said rakes will drop over the forward ends of the fixed guides 38 into the bottom of the hopper, as shown in Fig. 2. On their return stroke the said rakes pass over the bottom of the hoppers in such a manner as to remove the cotton therefrom, and at the end of the back stroke the rakes will pass under and raise the pivoted guides 40, and after the passage of the rakes these guides are returned by gravity to their normal inclined position, the cotton having been raked out into receptacles 53, suitably hung on the rear portion of the frame A.

It will be understood from the drawings that the upper rollers 17 are fixed against movement other than rotary, but the rollers 20, being loosely hung in the hangers 18 and 22, are capable of swinging to or from each other at their rear ends, the forward hangers 22 being fixed to the frame, while the rear hangers 18 are pivotally hung on the shafts 16. I provide springs 54, adapted to hold the said hangers 18 normally pressed toward each other at their lower ends to permit them to be forced apart to admit of the passage of the machine over a healthy cotton-stalk or other obstruction.

In operation the machine is driven along a row of plants, the horses, two of which are employed, walking in the furrows at the sides of the row, and the said plants are pressed between the picker-cloths 23 at the forward end of the frame, where the cloths are farthest apart, and are gradually compressed between the said cloths and the spreader until they emerge at the rear part of the machine, where the space between the said cloths and spreader is reduced to a minimum. The cloths or aprons 23, being in rapid movement, engage with and remove the cotton from the bolls of the plants and carry the same upward over the rollers or drums 17, at which point the cotton is removed from the cloths by the cleaning-rollers 36 and delivered into the hoppers 37. The rakes 42, playing in these hoppers, discharge the cotton from the hoppers into the bags or receptacles placed to receive it.

A machine constructed as above described is extremely simple, durable, and inexpensive and will be found very effective in operation, since it is adapted to pick a greater percentage of cotton from the bolls than any other machine within the knowledge of the inventor, and the cotton when picked will be free from dirt or foreign matter, owing to such substances not being adapted to be retained by the picker cloths or aprons. Such picker-cloths, moreover, are protected from becoming damaged or soiled by contact with the earth, stones, &c., which they may encounter in the field by means of the shoes 21.

It will be obvious from the above description of my invention that considerable modification may be made in the construction and arrangement of the principal parts without material departure from the principles of the invention, and for this reason I do not wish to be understood as limiting myself to the precise form of the device herein shown and described.

Having thus described my invention, I claim as new and desire to secure by Letters Patent—

1. In a cotton picker or harvester, diverging picking-aprons, the space between them being widest at the top, and a spreader located between the aprons, having its sides tapered correspondingly to the taper of the aprons in an upward direction, as and for the purpose specified.

2. In a cotton-harvester, picking-aprons diverging upwardly from their lower portions, and a spreader located between said aprons, having its sides inclined in substantially the same direction as the faces of the aprons between which the said spreader is located, as and for the purpose specified.

3. In a cotton picker or harvester, picking-aprons diverging from their lower portions in an upwardly direction, the said aprons converging laterally from the front toward the rear, and a spreader located between the aprons, the lateral faces whereof diverge from the front to the rear, as and for the purpose specified.

4. In a cotton-harvester, two opposite picking-aprons converging from the front toward the rear, and a spreader located between the aprons, the lateral faces whereof diverge from the front to the rear, the forward end of the spreader being pointed, as and for the purpose specified.

5. In a cotton-harvester, two opposite picking-aprons converging from the front toward the rear, and a spreader located between the aprons, the lateral faces whereof diverge from the front to the rear, substantially as and for the purpose specified.

6. In a cotton-harvester, picking-aprons mounted to revolve, cleaning-rollers in engagement with the upper delivery-surfaces of the aprons, boxes arranged to receive the cotton from the cleaning-rollers, rakes mounted to reciprocate in the said boxes, supports located at the delivery ends of the boxes, receptacles carried by the supports, said receptacles receiving the cotton from the boxes, driving devices for the aprons, and a spreader located between the aprons, having a pointed forward end and being adapted to guide cotton to the aprons, the rakes being operated from the ground-wheel of the aforesaid picker, as and for the purpose specified.

7. In a cotton-harvester, two oppositely-diverging picker-aprons, and a spreader located between the aprons, the side faces whereof diverge in substantially the same direction as the faces of the aprons between which the spreader is located, as and for the purpose specified.

8. In a cotton-harvester, two oppositely-arranged picking-aprons having their opposing faces inclined from the top downward and inward, the said aprons laterally converging from the front toward the rear, and a spreader located between the aprons, substantially V-shaped in cross-section and laterally diverging from the front to the rear of the machine, as and for the purpose specified.

9. In a machine for picking cotton, picking-aprons, roller-supports for the same located at the top and bottom of the frame of the machine at each side of the center, the space between the upper supports for the aprons being greater than that between the lower supports, the said rollers being provided with teeth and the aprons with openings to receive the said teeth, the lower sides of the aprons diverging from the rear toward the front, drive-shafts and gears, substantially as described, driven by the movement of the machine and arranged for driving the roller-supports for the picking-aprons, and a spreader located between the aprons, consisting of a series of members V-shaped in plan view, the diverging ends of the members being their rear ends, springs normally serving to hold the lower portion of the spreader and aprons in substantially near relation with each other, and dispensing devices arranged to receive the cotton from the said picking-aprons and deliver the cotton to the rear portion of the machine, as and for the purpose specified.

10. In a cotton-picker, the combination, with picking-aprons converging at their lower sides with respect to a vertical line drawn between them, the said aprons being outwardly and forwardly flared in a lateral direction, tension-controlled supports for the aprons, the tension devices controlling the movement of the picking aprons to and from one another during the operation of picking, and a spreader located between the aprons, having its sides tapering from the top downward and inward, substantially as shown and described.

11. In a cotton picker or harvester, picker-aprons extending from the bottom to the top of the machine, being arranged to converge at their lower longitudinal portions and diverge at their upper longitudinal portions to and from a vertical line drawn longitudinally between them, and a spreader located between the aprons, having its sides tapered correspondingly to the taper of the aprons in an upward direction, the forward end of the spreader being pointed, producing a space between the forward portion of the spreader and the opposing faces of the aprons, the rear portion of the spreader at its sides being quite close to the sides of the aprons, as and for the purpose specified.

12. In a cotton-harvester two oppositely-diverging picker-aprons, the space between them being widest at the top, a spreader located between the aprons, having its sides tapered correspondingly to the taper of the aprons in an upward direction, cleaning-rollers supported in engagement with the upper surface of the aprons, and receptacles arranged to receive the cotton from the cleaning-rollers, whereby the cotton on any portion of a plant may be directed to the aprons and said cotton be rapidly harvested without injury to the plants, as and for the purpose specified.

DAVID S. DEADERICK.

Witnesses:
SAML. C. HARVEY,
H. W. ZENTZ.